United States Patent Office 2,792,352
Patented May 14, 1957

2,792,352

PROCESS FOR BREAKING PETROLEUM EMULSIONS EMPLOYING OXYALKYLATION DERIVATIVES OF CERTAIN POLYEPOXIDE MODIFIED PHENOL-ALDEHYDE RESINS

Melvin De Groote, University City, and Kwan-Ting Shen, Brentwood, Mo., assignors to Petrolite Corporation, Wilmington, Del., a corporation of Delaware No Drawing. Application February 19, 1953,
Serial No. 337,884

20 Claims. (Cl. 252—331)

This invention relates to processes or procedures particularly adapted for proventing, breaking, or resolving emulsions of the water-in-oil type, and particularly petroleum emulsions.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Attention is directed to our copending application Serial Number 324,814, filed December 8, 1952. Said copending application relates to a process for breaking petroleum emulsions of the water-in-oil type characterized by subjecting the emulsions to the action of a demulsifier including synthetic hydrophile products; said synthetic hydrophile products being oxyalkylation derivatives of the reaction products of certain phenol aldehyde resins, therein described in detail, with certain phenolic polyepoxides, also therein described in detail. Of particular importance in the process of said co-pending application are the oxyalkylation derivatives of the reaction products of phenol-aldehyde resins derived from difunctional monohydric phenols and aldehydes having not over 8 carbon atoms, particularly, formaldehyde, in which the difunctional monohydric phenol residue is derived from a hydrocarbon substituted phenol, with phenolic diepoxides of the following formula:

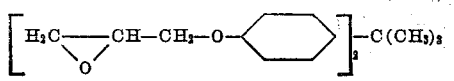

and cogenerically associated compounds formed in their preparation.

The present invention is analogous to the invention of said aforementioned copending application, Serial Number 324,814, filed December 8, 1952, except that the polyepoxides employed are characterized by being essentially hydrophile in character instead of hydrophobe in character. As noted in the aforementioned copending application, Serial Number 324,814, filed December 8, 1952, the polyepoxides invariably contain two or more phenolic nuclei but in any event have at least 6 and usually more carbon atoms in uninterrupted group or chain and thus contribute essential hydrophobe properties. Indeed, the invention of our copending application, Serial Number 324,814 may be characterized by the use of diglycidyl compounds described in said copending application and also elsewhere. As for example, in U. S. 2,500,449, dated March 14, 1950, to Bradley, in which there are described glycidyl ethers represented by the formula

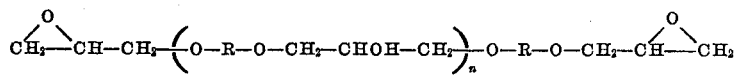

wherein R represents the divalent hydrocarbon radical of a dihydric phenol and $n$ is an integer of the series 0, 1, 2, 3, etc. More specifically, such diglycidyl ethers may be illustrated by the following formula

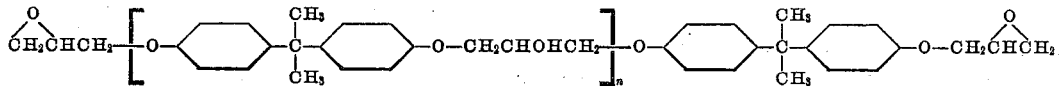

wherein $n$ is an integer of the series 0, 1, 2, 3, etc.

In contradistinction to such diglycidyl ethers which introduce an essentially hydrophobe radical or radicals, the present invention is characterized by analogous compounds derived from diglycidyl ethers which do not introduce any hydrophobe properties in its usual meaning but in fact are more apt to introduce hydrophile properties. Thus, the diepoxides employed in the present invention are characterized by the fact that the divalent radical connecting the terminal epoxide radicals contains less than 5 carbon atoms in an interrupted chain. For instance, a simple member and one of the most readily available members of the class of diepoxides described in our aforementioned copending application, Serial Number 324,814, filed December 8, 1952, is

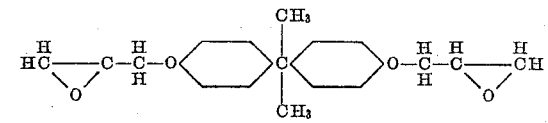

It is to be noted in this formula the terminal epoxy radicals are separated by the divalent hydrophobe group

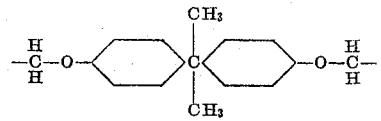

The diepoxides employed in the present process are obtained from glycols such as ethylene glycol, diethylene glycol, propylene glycol, dipropylene glycol, tripropylene glycol, butylene glycol, dibutylene glycol, tributylene glycol, glycerol, diglycerol, triglycerol, and similar compounds. Such products are well known and are characterized by the fact that there are not more than 4 uninterrupted carbon atoms in any group which is part of the radical joining the epoxide groups. Of necessity such diepoxides must be nonaryl or aliphatic in character. The digylcidyl ethers of copending application, Serial Number 324,814, filed December 8, 1952, are invariably and inevitably aryl in character.

The diepoxides employed in the present process are usually obtained by reacting a glycol or equivalent compound such as glycerol or diglycerol with epichlorohydrin and subsequently with an alkali. Such diepoxides have been described in the literature and particularly the patent literature. See for example, Italian Patent 400,973, dated August 8, 1941. See also British Patent 518,057 dated December 10, 1938. See U. S. Patent 2,070,990, dated February 16, 1937, to Groll et al. Reference is also made to U. S. Patent 2,581,464, dated January 8, 1952, to Zech. This particular last mentioned patent describes a composition of the following general formula

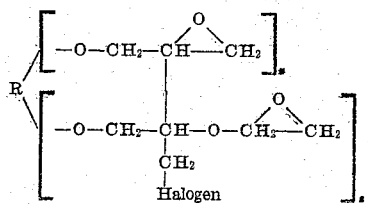

in which $x$ is at least 1, $z$ varies from less than 1 to more than 1, and $x$ and $z$ together are at least 2 and not more than 6, and R is the residue of the polyhydric alcohol remaining after replacement of at least 2 of the hydroxyl groups thereof with the epoxide ether groups of the above formula and any remaining groups of the residue being free hydroxyl groups.

It is obvious from what is said in the patent that variance can be obtained in which the halogen is replaced by a hydroxyl radical, thus the formula would become

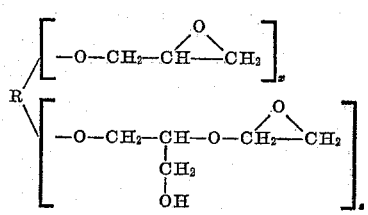

Reference to being thermoplastic characterizes them as being liquids at ordinary temperature or readily convertible to liquids by merely heating below the point of pyrolysis and thus differentiates them from infusible resins. Reference to being soluble in an organic solvent means any of the usual organic solvents such as alcohols, ketones, esters, ethers, mixed solvents, etc. Reference to solubility is merely to differentiate from a reactant which is not soluble and might be not only insoluble but also infusible. Furthermore, solubility is a factor insofar that it sometimes is desirable to dilute the compound containing the epoxy rings before reacting with an amine condensate. In such instances, of course, the solvent selected would have to be one which is not susceptible to oxyalkylation, as, for example, kerosene, benzene, toluene, dioxane, possibly various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring, i. e., the 1,2-epoxy ring. Furthermore, where a compound has two or more oxirane rings they will be referred to as polyepoxides. They usually represent, of course, 1,2-epoxide rings or oxirane rings in the alpha-omega position. This is a departure, of course, from the standpoint of strictly formal nomenclature as in the example of the simplest diepoxide which contains at least 4 carbon atoms and is formally described as 1,2-epoxy-3,4-epoxybutane (1,2,3,4 diepoxybutane).

It well may be that even though the previously suggested formula represents the principal component, or components, of the resultant or reaction product described in the previous text, it may be important to note that somewhat similar compounds, generally of much higher molecular weight, have been described as complex resinous epoxides which are polyether derivatives of polyhydric compounds containing an average of more than one epoxide group per molecule and free from functional groups other than epoxide and hydroxyl groups. The compounds here included are limited to the monomers or the low molal members of such series and generally contain two epoxide rings per molecule and may be entirely free from a hydroxyl group. This is important because the instant invention is directed towards products which are not insoluble resins and have certain solubility characteristics not inherent in the usual thermosetting resins. Note, for example, that said U. S. Patent No. 2,494,295 describes products wherein the epoxide derivative can combine with a sulfonamide resin. The intention in said U. S. Patent 2,494,295, of course, is to obtain ultimately a suitable resinous product having the characteristics of a comparatively insoluble resin. Simply for purpose of illustration to show a typical diglycidyl ether of the kind herein employed, reference is made to the following formula:

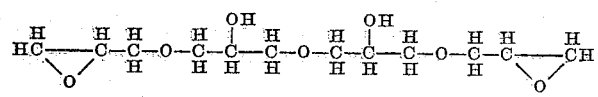

or if derived from cyclic diglycerol the structure would be thus:

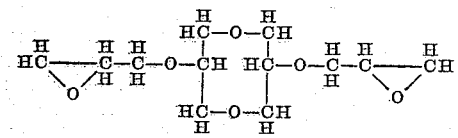

Commercially available compounds seem to be largely the former with comparatively small amounts, in fact comparatively minor amounts, of the latter.

Having obtained a reactant having generally 2 epoxy rings as depicted in the next to last formula preceding, or low molal polymers thereof, it becomes obvious the reaction can take place with any phenol-aldehyde resin by virtue of the fact that there are always present reactive hydroxyl radicals which are part of the phenolic nuclei.

To illustrate the products which represent the subject matter of the present invention reference will be made to a reaction involving a mole of the oxyalkylating agent, i. e., the compound having two oxirane rings and a phenol-aldehyde resin. Proceeding with the example previously described it is obvious the reaction ratio of two moles of the phenol-aldehyde resin to one mole of the oxyalkylating agent gives a product which may be indicated as follows:

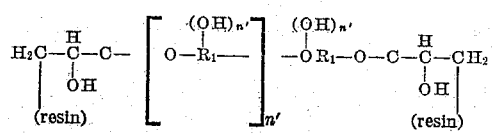

in which $n'$ is a small whole number less than 10, and usually less than 4, and including O, and $R_1$ represents a divalent radical as previously described being free from any radical having more than 4 uninterrupted carbon atoms in a single chain, and the characterization "resin" is simply an abbreviation for the resin which is described in greater detail subsequently.

In recapitulation then the present invention relates to a process for breaking petroleum emulsions of the water-in-oil type characterized by subjecting the emulsions to the action of a demulsifier including synthetic hydrophile products; said products being oxyalkylation derivatives of the reaction products of certain phenol-aldehyde resins, hereinafter described in detail, with certain non-aryl hydrophile polyepoxides, also hereinafter described in detail. Of particular importance are the oxyalkylation derivatives of the reaction products of phenol-aldehyde resins derived from difunctional monohydric phenols and aldehydes not having over 8 carbon atoms, particularly, formaldehyde, in which the difunctional monohydric phenol residue is derived from a hydrocarbon substituted phenol, with non-aryl hydrophile polyepoxides characterized by the fact that the percursory polyhydric alcohol, in which an oxygen-linked hydrogen atom if subsequently replaced by the radical

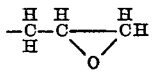

in the epoxide, is water soluble.

As far as the use of the herein described products goes for the purpose of resolving petroleum emulsions of the water-in-oil type, we prefer to employ oxyalkylated derivatives, which are obtained by the use of mono-epoxides, in such manner that the derivatives so obtained have sufficient hydrophile character to meet at least the test set forth in U. S. Patent No. 2,499,368, dated March 7, 1950, to De Groote and Keiser. In said patent such test for emulsification using a water-insoluble solvent, generally xylene, is described as an index of surface activity.

In the present instance the various oxyalkylated derivatives obtained particularly by use of ethylene oxide, propylene oxide, etc., may not necessarily be xylene-soluble although they are xylene-soluble in a large number of instances. If such compounds are not xylene-soluble the obvious chemical equivalent, or equivalent chemical test, can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test obviously is the same for the reason that there will be two phases on vigorous shaking and surface activity makes its presence manifest. It is understood the reference in the hereto appended claims as to the use of xylene in the emulsification test includes such obvious variant.

Another peculiarity of the compounds herein described is that they may pass into a comparatively high molecular weight range and be effective for various purposes, not only for the resolution of petroleum emulsions but also for other industrial uses described in detail elsewhere. This characteristic may be related to the fact that the initial resin molecule, obtained in turn from two resin molecules combined by means of a polyepoxide as described, results in a fairly large molecule. We have found we can obtain compounds effective for purposes where surface-active materials are employed, whether it be the resolution of petroleum emulsions or other uses, in which one part of the derivative obtained by the polyepoxide reaction is combined with 50 parts, by weight, of the alkylene oxide, i. e., the intermediate polyepoxide derivative may contribute somewhat less than 2% of the total oxyalkylated molecule. The word "oxyalkylated" is employed in this sense for purpose of convenience in referring to the mono-epoxide derivatives only.

For purpose of convenience what is said hereinafter will be divided into five parts:

Part 1 is concerned with the non-aryl diepoxides employed with reactants;

Part 2 is concerned with suitable phenol-aldehyde resins to be employed in reaction with the diepoxides;

Part 3 is concerned with reactions involving the two preceding types of materials and examples obtained by such reaction. Generally speaking, this involves nothing more than a reaction between two moles of a previously prepared phenol-aldehyde resin as described and one mole of a specified diglycidyl ether so as to yield a new and larger resin molecule;

Part 4 is concerned with the oxyalkylation of the previously described resultant or cogeneric mixture which, for sake of simplicity, may be referred to as a diepoxide derived dimer. Such language is merely an approximation of its structure. Oxyalkylation is more conveniently employed in the text to indicate the use of the previously indicated monoepoxides;

Part 5 is concerned with the resolution of petroleum emulsions of the water-in-oil type by means of the previously described chemical compounds or reaction products.

PART 1

Reference is made to previous patents as illustrated in the manufacture of the non-aryl diepoxides employed as reactants in the instant invention. More specifically, those patents are the following: Italian Patent 400,973, dated August 4, 1941; British Patent 518,057, dated December 10, 1938; U. S. Patent 2,070,990, dated February 16, 1937 to Groll et al.; and U. S. Patent 2,581,464, dated January 8, 1952 to Zech. The simplest diepoxide is probably the one derived from 1,3-butadiene or isoprene. Such derivatives are obtained by the use of peroxides or by other suitable means and the diglycidyl ethers may be indicated thus

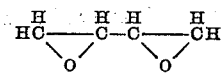

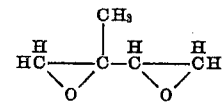

In some instances the compounds are essentially derivatives of etherized epichlorohydrin or methyl epichlorohydrin. Needless to say, such compounds can be derived from glycerol monochlorohydrin by etherization prior to ring closure. An example is illustrated in the previously mentioned Italian Patent 400,973.

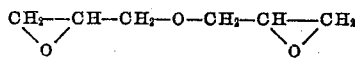

Another type of diepoxide is diisobutenyl dioxide as described in aforementioned U. S. Patent 2,070,990, dated February 16, 1937 to Groll, and is of the following formula

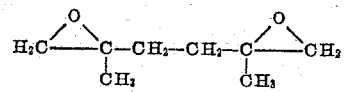

The diepoxides previously described may be indicated by the following formula

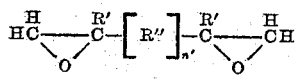

in which R' represents a hydrogen atom or methyl radical and R" represents the divalent radical uniting the two terminal epoxide groups, and $n'$ is the numeral 0 or 1. As previously pointed out in the case of the butadiene derivative, $n'$ is 0. In the case of diisobutenyl dioxide R" is $CH_2-CH_2$ and $n'$ is 1. In another example previously referred to R" is $CH_2OCH_2$ and $n'$ is 1.

However, for practical purposes the only diepoxide available in quantities other than laboratory quantities is a derivative of glycerol or epichlorohydrin. This particular diepoxide is obtained from acyclic diglycerol and epichlorohydrin or equivalent thereof in that the epichlorohydrin itself may supply the glycerol or diglycerol radical in addition to the epoxy rings. As has been previously suggested, instead of starting with glycerol or a glycerol derivative, one could start with any one of a number of glycols or polyglycols and it is more convenient to include as part of the terminal oxirane ring radical the oxygen atom that was derived from epichlorohydrin or, as might be the case, methyl epichlorohydrin.

So presented the formula becomes

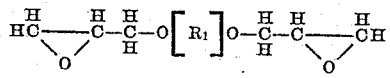

In the above formula $R_1$ is selected from groups such as the following:

$C_2H_4$
$C_2H_4OC_2H_4$
$C_2H_4OC_2H_4OC_2H_4$
$C_3H_6$
$C_3H_6OC_3H_6$
$C_3H_6OC_3H_6OC_3H_6$
$C_4H_8$
$C_4H_8OC_4H_8$
$C_4H_8OC_4H_8OC_4H_8$
$C_3H_5(OH)$
$C_3H_5(OH)OC_3H_5(OH)$
$C_3H_5(OH)OC_3H_5(OH)OC_3H_5(OH)$

It is to be noted that in the above epoxides there is a complete absence of (a) aryl radicals and, (b) radicals in which 5 or more carbon atoms are united in a single uninterrupted single group. $R_1$ is inherently hydrophile in character as indicated by the fact that it is specified that the precursory diol or polyol HOROH must be water soluble in substantially all proportions, i. e., water miscible.

Stated another way, what is said previously means that a polyepoxide such as

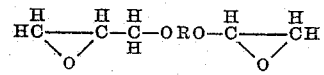

is derived actually or theoretically, or at least derivable, from the diol HOROH, in which the oxygen-linked hydrogen atoms were replaced by

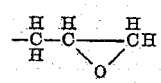

Thus $R(OH)_n$ where $n$ represents a small whole number which is 2 or more, must be water-soluble. Such limitation excludes polyepoxides if actually derived or theoretically derived at least, from water-insoluble diols or water-insoluble triols or higher polyols. Suitable polyols may contain as many as 12 to 20 carbon atoms or thereabouts.

Referring to a compound of the type above in the formula

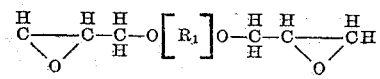

in which $R_1$ is $C_3H_5(OH)$ it is obvious that reaction with another mole of epichlorohydrin with appropriate ring closure would produce a triepoxide or, similarly, if $R_1$ happened to be $C_3H_5(OH)OC_3H_5(OH)$, one could obtain a tetraepoxide. Actually, such procedure generally yields triepoxides, or mixtures with higher epoxides and perhaps in other instances mixtures in which diepoxides are also present. Our preference is to use the diepoxides.

There is available commercially at least one diglycidyl ether free from aryl groups and also free from any radical having 5 or more carbon atoms in an uninterrupted chain. This particular diglycidyl ether is obtained by the use of epichlorohydrin in such a manner that approximately four moles of epichlorohydrin yield one mole of the diglycidyl ether or, stated another way, it can be considered as being formed from one mole of acyclic diglycerol and two moles of epichlorohydrin so as to give the appropriate diepoxide. The molecular weight is approximately 370 and the number of epoxide groups per molecule are approximately two. For this reason, in the first of a series of subsequent examples this particular diglycidyl ether is used, although obviously any of the other previously described would be just as suitable. For convenience, this diepoxide will be referred to as diglycidyl ether A, illustrated by a prior formula.

Using laboratory procedure we have reacted diethylene glycol with epichlorohydrin and subsequently with alkali so as to produce a product which, on examination, corresponded approximately to the following compound

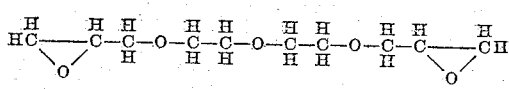

The molecular weight of the product was assumed to be 230 and the product was available in laboratory quantities only. For this reason, the subsequent table referring to the use of this particular diepoxide, which will be referred to as diglycidyl ether B, is in grams instead of pounds.

Probably the simplest terminology for these polyepoxides, and particularly diepoxides, to differentiate from comparable aryl compounds is the terminology "epoxyalkanes" and, more particularly, polyepoxyalkanes or diepoxyalkanes. The difficulty is that the majority of these compounds represent types in which a carbon atom chain is interrupted by an oxygen atom and, thus, they are not strictly alkane derivatives. Furthermore, they may be hydroxylated or represent a heterocyclic ring. The principal class properly may be referred to as polyepoxypolyglycerols, or diepoxypolyglycerols.

Other examples of diepoxides involving a heterocyclic ring having, for example, 3 carbon atoms and 2 oxygen atoms, are obtainable by the conventional reaction of combining erythritol with a carbonyl compound, such as formaldehyde or acetone, so as to form the 5-membered ring, followed by conversion of the terminal hydroxyl groups into epoxy radicals.

PART 2

This part is concerned with the preparation of phenol-aldehyde resins of the kind described in detail in U. S. Patent No. 2,499,370, dated March 7, 1950, to De Groote and Keiser, with the following qualifications; said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U. S. Patent No. 2,499,370, reference is made also to the following U. S. patents: Numbers 2,499,365, 2,499,366 and 2,499,367, all dated March 7, 1950, to De Groote and Keiser. These patents, along with the other two previously mentioned patents, describe phenolic resins of the kind herein employed as initial materials.

For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol or a mixture of the same. Such resins are described also in issued patents, for instance, U. S. Patent No. 2,499,365, dated March 7, 1950, to De Groote and Keiser, such as Example 71a.

It is sometimes desirable to present the resins herein employed in an over-simplified form which has appeared from time to time in the literature, and particularly in the patent literature; for instance, it has been stated that the composition is approximated in an idealized form by the formula

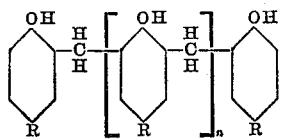

In the above formula $n$ represents a small whole number carrying from 1 to 6, 7 or 8, or more, up to probably 10 or 12 units, particularly when the resin is subjected to heating under a vacuum as described in the literature. A limited sub-genus is in the instance of low molecular weight polymers where the total number of phenolic nuclei carries from 3 to 6, i. e., $n$ varies from 1 to 4; R represents an aliphatic hydrocarbon substituent, generally an alkyl radical having from 4 to 14 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

In the above formula the aldehyde employed in the resin manufacture is formaldehyde. Actually some other aldehyde such as acetaldehyde, propionaldehyde, or butylraldehyde may be used. The resin unit can be exemplified thus:

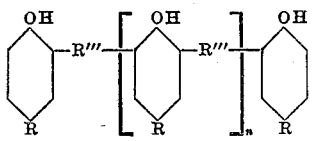

in which R''' is the divalent radical obtained from the particular aldehyde employed to form the resin.

As previously stated, the preparation of resins, the kind herein employed as reactants, is well known. See U. S. Patent No. 2,499,368, dated March 7, 1950, to De Groote and Keiser. Resins can be made using an acid catalyst or basic catalyst or a catalyst showing neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 10th of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins we found no reason for using other than those which are lowest in price and most readily available commercially. For purpose of convenience suitable resins are characterized in the following table:

TABLE I

| Example number | R | Position of R | R''' derived from— | n | Mol. wt. of resin molecule (based on n+2) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclohexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclohexyl | do | do | 2.0 | 740.0 |

PART 3

As previously stated, the intermediate reactions involve two moles of a phenol-aldehyde resin of the kind previously described, and one mole of a diglycidyl ether as described. The reaction is essentially an oxyalkylation but, for sake fo convenience is differentiated from the subsequent oxyalkylation procedure which involves a mono-epoxide only. Since the polyepoxide is non-volatile as compared, for example, to ethylene oxide, the reaction is comparatively simple. On the other hand, purely as a matter of convenience, one generally would conduct both class of reactions in the same equipment. In other words, the two moles of phenol-aldehyde resin would be reacted with a polyepoxide and then subsequently with a mono-epoxide. In any event, the polyepoxide reaction can be conducted in an ordinary reaction vessel, such as the usual glass laboratory equipment. This is particularly true of the kind used for resin manufacture as described in a number of patents, as for example, previously mentioned U. S. Patent No. 2,499,365. One can use a variety of catalysts in connection with the polyepoxide of the same class employed with mono-epoxide. In fact, the reaction will go at an extremely slow rate without any catalyst at all. The usual catalysts include alkaline materials such as caustic soda, caustic potash, sodium methylate, etc. Other catalysts may be acidic in nature and are of the kind characterized by iron and tin chlorides. Furthermore, insoluble catalysts such as clays or specially prepared mineral catalysts have been used. For practical purposes it is best to use a catalyst which can remain in the reaction mass and will continue to serve as a catalyst in connection with the oxyalkylation employing the mono-epoxide. For this reason we have preferred to use a small amount of finely divided caustic soda or sodium methylate as a catalyst. The amount generally employed is 1%, 2%, or 3% of these alkaline catalysts.

Actually, the reactions of polyepoxides with various resin materials have been thoroughly described in the literature and the procedure is, for all purposes, the same as with glycide which is described in detail in the next succeeding part, to wit, Part 4.

The use of an excessive amount of catalyst may produce side reactions as in the case of glycide. For the sake of simplicity the procedure will be illustrated by examples but particular reference is made again to the further discussion of oxyalkylation reactions and procedures in Part 4.

It goes without saying that the reaction can take place in an inert solvent, i. e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The solvent so selected should be one which, of course, is suitable in the oxyalkylation step involving the mono-epoxides described subsequently. The solvent selected may depend on the ability to remove it by subsequent distillation if required.

Example 1b

The phenol-formaldehyde resin employed was the one previously identified as 38a, having a molecular weight of approximately 700; the amount employed was 1408 grams. The resin was finely powdered and 1,000 grams of xylene added. The mixture was heated to approximately 90° C. and stirred until the solution was complete. 26 grams of sodium methylate were then added and stirring continued until complete solution or distribution was obtained. The mixture was heated to 100° C. and left at this temperature while 370 grams of the diepoxide, previously identified as Polyepoxide A, were added. It was added in solution form and mixed with 500 grams of solvent. The solvent used was an 80–20 mixture of xylene and diethylether of ethyleneglycol. This solution was added dropwise. Just before the addition of the diepoxide the temperature was raised to somewhat above 100° C.—near 110° C. The time required to add the diepoxide was approximately 2 hours. The temperature rose during this period to approximately 130° C. The product was then allowed to reflux at this approximate temperature for the next 2½ hours. During this period there was a modest loss of xylene and the temperature rose slightly to about 130° C. Heating was then allowed to proceed for about 8 hours longer and part of the xylene was removed by means of a conventional phase-separating trap so that at the end of the period the temperature had risen to approximately 140° C. Refluxing was then continued further with the removal of a bit more xylene and at the end of this additional period the temperature had reached approximately 160° C. The overall reaction period was 17 hours. At the end of this time there was a slight residue equivalent to probably less than 5 cc. in the bottom of the reaction flask or pot and a slight amount of xylene was added, approximately 75 grams, in order to have the final reaction mass represent about one-half reaction mass and one-half solvent. Subsequent tests in an evaporating dish, with due allowance for the glycol ether, showed there was approximately 49% solvent and 51% reaction mass.

The procedure employed, of course, is simple in light of what has been said previously and also in light of what is said in the next section. Various examples obtained in substantially the same manner are enumerated and described in the following tables:

TABLE II

| Ex. No. | Resin used | Resin used, grams | Dissolved in xylene, grams | Sod. methylate used, grams | Polyepoxide used | Polyepoxide used, grams | Dissolved in 80-20 mixture xylene and diethyl ether of ethylene glycol, grams | Reaction temp. range, °C. | Approx. time of reaction, hrs. | Percentage solvent in final product |
|---|---|---|---|---|---|---|---|---|---|---|
| 1b | 38a | 1,408 | 1,000 | 26 | A | 370 | 500 | 90-160 | 17 | 49 |
| 2b | 1a | 1,985 | 1,000 | 35 | A | 370 | 500 | 90-155 | 16 | 50 |
| 3b | 2a | 1,765 | 1,000 | 49 | A | 370 | 500 | 85-155 | 18 | 51 |
| 4b | 4a | 2,050 | 1,000 | 28 | A | 370 | 500 | 85-160 | 22 | 50 |
| 5b | 9a | 2,380 | 1,000 | 38 | A | 370 | 500 | 95-160 | 19 | 49 |
| 6b | 10a | 2,535 | 1,000 | 27 | A | 370 | 500 | 85-155 | 22 | 51 |
| 7b | 13a | 1,890 | 1,000 | 23 | A | 370 | 500 | 100-145 | 18 | 50 |
| 8b | 15a | 2,660 | 1,000 | 25 | A | 370 | 500 | 85-160 | 17 | 49 |
| 9b | 18a | 2,913 | 1,000 | 36 | A | 370 | 500 | 80-145 | 20 | 51 |
| 10b | 19a | 2,017 | 1,000 | 38 | A | 370 | 500 | 90-160 | 16 | 50 |
| 11b | 27a | 1,272 | 1,000 | 23 | A | 370 | 500 | 85-160 | 20 | 50 |
| 12b | 30a | 1,496 | 1,000 | 32 | A | 370 | 500 | 100-145 | 18 | 51 |
| 13b | 40a | 1,480 | 1,000 | 27 | A | 370 | 500 | 80-145 | 17 | 49 |
| 14b | 28a | 1,210 | 1,000 | 25 | A | 370 | 500 | 85-155 | 20 | 50 |
| 15b | 29a | 1,300 | 1,000 | 28 | A | 370 | 500 | 80-150 | 18 | 49 |
| 16b | 30a | 1,110 | 1,000 | 23 | A | 270 | 500 | 90-155 | 17 | 51 |
| 17b | 31a | 1,380 | 1,000 | 28 | A | 370 | 500 | 85-160 | 22 | 50 |
| 18b | 32a | 1,590 | 1,000 | 26 | A | 370 | 500 | 90-160 | 18 | 50 |

TABLE III

| Ex. No. | Resin | Probable mol. wt. of reaction product | Amt. of product, grs. | Amt. of solvent, grs. | Probable number of hydroxyls per molecule |
|---|---|---|---|---|---|
| 1b | 38a | 1,763 | 3,578 | 1,815 | 10 |
| 2b | 1a | 2,343 | 4,665 | 2,325 | 13 |
| 3b | 2a | 2,120 | 4,320 | 2,200 | 13 |
| 4b | 4a | 2,406 | 4,797 | 2,391 | 13 |
| 5b | 9a | 2,736 | 5,457 | 2,721 | 13 |
| 6b | 10a | 2,890 | 5,765 | 2,875 | 13 |
| 7b | 13a | 2,246 | 4,477 | 2,231 | 13 |
| 8b | 15a | 3,015 | 6,015 | 3,000 | 13 |
| 9b | 18a | 3,268 | 6,521 | 3,253 | 13 |
| 10b | 19a | 2,372 | 4,635 | 2,263 | 13 |
| 11b | 37a | 1,627 | 3,239 | 1,612 | 10 |
| 12b | 39a | 1,851 | 3,687 | 1,836 | 10 |
| 13b | 40a | 1,835 | 3,655 | 1,820 | 10 |
| 14b | 28a | 1,565 | 3,115 | 1,550 | 9 |
| 15b | 29a | 1,665 | 3,362 | 1,697 | 9 |
| 16b | 30a | 1,665 | 2,915 | 1,250 | 9 |
| 17b | 31a | 1,735 | 3,455 | 1,720 | 9 |
| 18b | 32a | 1,945 | 3,875 | 1,930 | 9 |

TABLE V

| Ex. No. | Resin | Probable mol. wt. of reaction product | Amt. of product, grs. | Amt. of solvent, grs. | Probable number of hydroxyls per molecule |
|---|---|---|---|---|---|
| 1c | 38a | 1,613 | 3,178 | 1,565 | 8 |
| 2c | 1a | 2,193 | 4,265 | 2,072 | 11 |
| 3c | 2a | 1,970 | 3,920 | 1,950 | 11 |
| 4c | 4a | 2,256 | 4,397 | 2,141 | 11 |
| 5c | 9a | 2,586 | 5,057 | 2,471 | 11 |
| 6c | 10a | 2,740 | 5,365 | 2,625 | 11 |
| 7c | 13a | 2,096 | 4,077 | 1,981 | 11 |
| 8c | 15a | 2,865 | 5,615 | 2,750 | 11 |
| 9c | 18a | 3,118 | 6,121 | 3,003 | 11 |
| 10c | 19a | 2,222 | 4,235 | 2,013 | 11 |
| 11c | 37a | 1,477 | 2,839 | 1,362 | 8 |
| 12c | 39a | 1,701 | 3,287 | 1,586 | 8 |
| 13c | 40a | 1,685 | 3,255 | 1,570 | 8 |
| 14c | 28a | 1,415 | 2,715 | 1,300 | 7 |
| 15c | 29a | 1,515 | 2,962 | 1,447 | 7 |
| 16c | 30a | 1,515 | 2,515 | 1,000 | 7 |
| 17c | 31a | 1,585 | 3,055 | 1,470 | 7 |
| 18c | 32a | 1,795 | 3,475 | 1,680 | 7 |

TABLE IV

| Ex. No. | Resin used | Resin used, grams | Dissolved in xylene, grams | Sod. methylate used, grams | Polyepoxide used | Polyepoxide used, grams | Dissolved in 50-50 mixture xylene and diethyl ether of ethylene glycol, grams | Reaction temp. range, °C. | Approx. time of reaction, hrs. | Percentage solvent in final product |
|---|---|---|---|---|---|---|---|---|---|---|
| 1c | 38a | 1,408 | 1,000 | 27 | B | 230 | 250 | 90-155 | 18 | 50 |
| 2c | 1a | 1,985 | 1,000 | 32 | B | 230 | 250 | 90-160 | 16 | 49 |
| 3c | 2a | 1,765 | 1,000 | 35 | B | 230 | 250 | 85-155 | 17 | 51 |
| 4c | 4a | 2,050 | 1,000 | 26 | B | 230 | 250 | 90-160 | 20 | 49 |
| 5c | 9a | 2,380 | 1,000 | 28 | B | 230 | 250 | 85-160 | 19 | 50 |
| 6c | 10a | 2,535 | 1,000 | 38 | B | 230 | 250 | 80-145 | 22 | 51 |
| 7c | 13a | 1,890 | 1,000 | 27 | B | 230 | 250 | 100-145 | 18 | 49 |
| 8c | 15a | 2,660 | 1,000 | 23 | B | 230 | 250 | 85-155 | 17 | 50 |
| 9c | 18a | 2,913 | 1,000 | 25 | B | 230 | 250 | 90-155 | 19 | 51 |
| 10c | 19a | 2,017 | 1,000 | 26 | B | 230 | 250 | 85-160 | 22 | 49 |
| 11c | 27a | 1,272 | 1,000 | 38 | B | 230 | 250 | 90-160 | 18 | 50 |
| 12c | 39a | 1,496 | 1,000 | 26 | B | 230 | 250 | 80-145 | 20 | 51 |
| 13c | 40a | 1,480 | 1,000 | 27 | B | 230 | 250 | 100-145 | 17 | 49 |
| 14c | 28a | 1,210 | 1,000 | 28 | B | 230 | 250 | 85-155 | 19 | 50 |
| 15c | 29a | 1,300 | 1,000 | 25 | B | 230 | 250 | 80-150 | 20 | 51 |
| 16c | 30a | 1,110 | 1,000 | 28 | B | 230 | 250 | 80-155 | 18 | 49 |
| 17c | 31a | 1,380 | 1,000 | 23 | B | 230 | 250 | 85-160 | 17 | 50 |
| 18c | 32a | 1,590 | 1,000 | 25 | B | 230 | 250 | 90-155 | 19 | 51 |

PART 4

In preparing oxyalkylated derivatives of products of the kind which appear as examples in Part 3, we have found it particularly advantageous to use laboratory equipment which permits continuous oxypropylation and oxyethylation. More specific reference will be made to treatment with glycide subsequently in the text. The oxyethylation step is, of course, the same as the oxypropylation step insofar that two low-boiling liquids are handled in each instance. The oxyalkylation step is carried out in a manner which is substantially conventional for the oxyalkylation of compounds having labile hydrogen atoms, and for that reason a detailed description of the procedure is omitted and the process will simply be illustrated by the following examples:

Example 1d

The oxyalkylation-susceptible compound employed is the one previously designated as 14b. The preparation of 14b is described in Tables II and III.

15.65 pounds of diepoxide-derived compound or mixture designated as 14b was dissolved in approximately an equal weight of xylene as a solvent. The amount actually used was 15.5 pounds. To this there was added 1.56 pounds of finely pulverized caustic soda. The mixture of solvent, diepoxide-derived product and catalyst was stirred so as to obtain a uniform mixture. The autoclave employed had a capacity of approximately 25 gallons. In other preparations small autoclaves, for instance, 5, 10 or 15 gallons, have been used and in some instances autoclaves having a capacity of 35 to 50 gallons have been used. In some instances, as a matter of convenience, the transfer of the reaction mass was made from one autoclave to the other.

In this particular run adjustment was made in the autoclave so as to operate at a temperature of approximately 125–130° C. and at a pressure of 10 to 15 pounds per square inch. The time regulator was set so as to inject the ethylene oxide within approximately a half hour. The rotating stirrers were set so as to operate at approximately 400 R. P. M. The reaction went readily and, as a matter of fact, was completed in less than a half hour. Stirring was continued for about 40 minutes longer. The speed of reaction, particularly at the low pressure, undoubtedly was due in a large measure to excellent agitation and also to the high concentration of the catalyst. The amount of ethylene oxide introduced was approximately equal to the initial weight of the diepoxide-derived compound, i. e., 17.6 pounds. This represented a molal ratio of about 40 pounds of ethylene oxide per mole of diepoxide derivative. The theoretical molecular weight at the end of the reaction was approximately 3,500. A comparatively small sample, less than 50 grams, was withdrawn merely for examination as far as solubility or emulsifying power was concerned and also for purpose of making some tests in various oil field emulsions. The amount withdrawn was so small that no cognizance of this fact was included in the data or in subsequent data presented in Tables VI, VII, VIII, and IX. In innumerable comparative oxyalkylations we have withdrawn a substantial portion at the end of each step and continued oxyalkylation on a partial residual sample. This was not the case in this series. Certain examples were duplicated, as hereinafter noted, and subjected to oxyalkylation with a different oxide.

Example 2d

This simply illustrated the further oxyalkylation of Example 1d preceding. As previously stated, the oxyalklation-susceptible compound, to wit, 1d present at the beginning of this step, was obviously the same as at the end of the prior stage (Example 1b), to wit, 15.65 pounds. The amount of oxide present in the initial step was 17.6 pounds. The amount of catalyst remained the same, that is, 1.56 pounds, and the amount of solvent remained the same. The amount of oxide added was another 17.6 pounds, all additions of oxide in these various stages being based on the addition of this particular amount. Thus, at the end of the oxyalkylation step the oxide added was a total of 35.2 pounds and the molal ratio of ethylene oxide to diepoxide resin derivative was approximately 80 to 1. The theoretical molecular weight was 5,085. Conditions as far as temperature and pressure were concerned were the same as in the preceding period and in fact remained so during the entire series. For this reason, no further comment will be made in regard to either temperature or pressure. This applied also to the time period in this instance.

Example 3d

The oxyalkylation proceeded in the same manner as described in 1d and 2d. There was no added solvent and no added catalyst. The oxide added was 17.6 pounds and the total oxide at the end of the reaction was 52.8 pounds. The molal ratio of oxide to diepoxide resin derivative was approximately 120 to 1. The reaction time was the same as previously. The theoretical molecular weight was 6,845.

Example 4d

The oxyalkylation was continued and the amount of oxide added was 17.6 pounds. There was no addition of catalyst or solvent during the entire procedure. No further comment will be made in regard to these two items. The molal ratio of oxide to resin derivative was 160 to 1. The theoretical molecular weight at the end of the reaction period was approximately 8,605. The reaction time was three-fourths of an hour.

Example 5d

The oxyalkylation was continued with the introduction of another 17.6 pounds of ethylene oxide. The molal ratio at the end of the reaction period was approximately 200 to 1 and the theoretical molecular weight about 10,365. The reaction time was one and one-fourths hour.

Example 6d

The same procedure was followed as in the preceding steps with the result that at the end of the reaction period the ratio of oxide to resin derivative was 240 to 1, and the theoretical molecular weight was approximately 12,125. The time required to add the oxide was two hours.

Example 7d

The same procedure was the same as before, the amount of oxide added was the same as before, and the time required was approximately two hours. The ratio of oxide to resin derivative was 280 to 1 and the theoretical molecular weight was approximately 13,885.

Example 8d

This was the final oxyalkylation in this particular series. The amount of oxide added was the same as before and the total amount of oxide in at the end of the step was approximately 141 pounds. The molal ratio of oxide to resin derivative was 320 to 1 and the theoretical molecular weight was approximately 15,645. The time required was a little over two hours, to wit, two and one-fourth hours.

The same procedure was described in the previous examples was employed in connection with a number of the other condensates described previously. All these data have been presented in tabular form in a series of four tables, VI, VII, VIII, and IX.

In substantially every case a 25-gallon autoclave was employed, although in some instances the initial oxyethylation was started in a 15-gallon autoclave and then transferred to a 25-gallon autoclave. This is immaterial but happened to be a matter of convenience only. The solvent used in all cases was xylene. The catalyst used was finely powdered caustic soda.

Referring now to Table VI it will be noted that compounds 1d through 40d were obtained by the use of ethylene oxide, whereas 41d through 80d were obtained by the use of propylene oxide alone.

Thus in reference to Table VI it is to be noted as follows:

The example number of each compound is indicated in the first column.

The identity of the oxyalkylation-susceptible compound, to wit, the diepoxide treated resin, is indicated in the second column.

The amount of such derivative used is shown in the third column.

Assuming that ethylene oxide is employed, as happens to be the case in Example 1d through 40d, the amount of oxide present in the oxyalkylation derivative is shown in column 4, although in the initial step since no oxide is present there is a blank.

When ethylene oxide is used exclusively the 5th column is blank.

The 6th column shows the amount of powdered caustic soda used as a catalyst, and the 7th column shows the amount of solvent xylene employed.

The 8th column states the amount of alkylene oxide derivative present in the reaction mass at the end of the period.

As pointed as previously, in this particular series the amount of reaction mass withdrawn for examination was so small that it was ignored and for this reason the resin condensate in column 8 coincides with the figure in column 3.

Column 9 shows the amount of ethylene oxide employed in the reaction mass at the end of the particular period.

Column 10 can be ignored insofar that no propylene oxide was employed.

Column 11 shows the catalyst at the end of the reaction period.

Column 12 shows the amount of solvent at the end of the reaction period.

Column 13 shows the molal ratio of ethylene oxide to derivative.

Column 14 can be ignored for the reason that no propylene oxide was employed.

Referring now to Table VI. It is to be noted that the first column refers to Examples 1d, 2d, 3d, etc.

The second column gives the maximum temperature employed during the oxyalkylation step and the third column gives the maximum pressure.

The fourth column gives the time period employed.

The last three columns show solubility tests by shaking a small amount of the compound, including the solvent present, with several volumes of water, xylene and kerosene. It sometimes happens that although xylene in comparatively small amounts will dissolve in the concentrated material, when the concentrated material in turn is diluted with xylene separation takes place.

TABLE VI

Referring now to Table VI, Examples 41d through 80d, which, in essence are the counterparts of Examples 1d through 40d except the oxide employed is propylene oxide instead of ethylene oxide. Therefore, as previously explained three columns are blank, to wit, columns 4, 9, and 13.

Reference is now made to Table VII. It is to be noted that these compounds were designated by e numbers; that is, 1e, 2e, etc., through and including 32e. They are derived in turn from compounds of d series, to wit, 35d, 39d, 75d, and 79d. These compounds involve the use of both ethylene oxide and propylene oxide. Since compounds 1d through 40d were obtained with the use of ethylene oxide, it is obvious those obtained from 35d and 39d involve the use of ethylene oxide and propylene oxide afterwards. Inversely, those compounds obtained from 75d and 79d obviously were obtained from a previously prepared compound where propylene oxide was used first. In the series of e compounds, 1e through and including 32e, it will be noted that it required a duplication of four previously prepared compounds, to wit, 35d, 39d, 75d and 79d.

It is to be noted that reference to the catalyst in Table VIII refers to the total catalyst, i. e., the catalyst present from the first oxyalkylation step plus added catalyst, if any. The same is true in regard to the solvent. Reference to the solvent refers to the total solvent present, i. e., that from the first oxyalkylation step plus added solvent, if any.

It will be noted also that under the molal ratio the values of both oxides to the resin condensate are included.

The data given in regard to the operating conditions is substantially the same as before and appears in Table IX.

The products resulting from these procedures may contain modest amounts, or have small amounts, of the solvents as indicated by the figures in the tables. If desired the solvent may be removed by distillation, and particularly vacuum distillation. Such distillation also may remove traces or small amounts of uncombined oxide, if present and volatile under the conditions employed.

Obviously, in the use of ethylene oxide and propylene oxide in combination one need not first use one oxide and then the other, but one can mix the two oxides and thus obtain what may be termed an indifferent oxyalkylation, i. e., no attempt to selectively add one and then the other, or any other variant.

Needless to say, one could start with ethylene oxide and then use propylene oxide, and then go back to ethylene oxide, or, inversely, start with propylene oxide, then use ethylene oxide, and then go back to propylene oxide, or, one could use a combination in which butylene oxide is used along with either one of the two oxides just mentioned, or a combination of both of them.

The resins which are employed as raw materials vary from fairly high melting resins to resins melting near the boiling point of water, to other products whose melting points are only moderately above ordinary room temperature. Such resins vary in color from almost water-white to products which are dark amber or reddish amber in appearance. In some instances they are tacky solids, or even liquids at ordinary room temperatures. After treatment with diepoxides of the kind herein employed the resultant product is usually at least as dark, perhaps darker, than the initial resin. The solvent can be removed readily by distillation, particularly vacuum distillation. The product obtained after treatment with the described diepoxide is apt to be somewhat softer and more liquid than the original material. In some instances a tackiness develops which is suggestive of cross-linking in some obscure manner.

When products of the kind previously described are intended for subsequent reaction, such as oxyalkylation, the solvent and catalyst may be permitted to remain for ultimate use.

Oxyalkylation, particularly exhaustive oxyalkylation, tends to do a number of things such as reduce the color, make the product less viscous and may even render a thin liquid, and may reduce the amount of alkalinity present.

In any event whether the solvent is to be removed, or the product bleached at either stage, is simply a matter of the intended ultimate use. If employed for the resolution of petroleum emulsions there is no need to eliminate any alkalinity and no need to eliminate color or solvent.

If the product is to be employed in the manufacture of varnish resins the procedure should be conducted so as to hold the color at a minimum, or else the final product or intermediate product can be further bleached in the usual manner using earth, bleaching chars, or the like. Ultimately the solvent could be removed in any suitable manner by distillation, including vacuum distillation.

TABLE VI

| Ex. No. | Composition before | | | | | | Composition at end | | | | | Molal ratio | | Molec. wt. based on theoretical value |
|---|---|---|---|---|---|---|---|---|---|---|---|---|---|---|
| | O–S* cmpd., ex.No. | O–S* cmpd., lbs. | Ethl. oxide, lbs. | Propl. oxide, lbs. | Catalyst, lbs. | Solvent, lbs. | O–S* cmpd., lbs. | Ethl. oxide, lbs. | Propl. oxide, lbs. | Catalyst, lbs. | Solvent, lbs. | Ethyl. oxide to oxyalkyl. suscept. cmpd. | Propl. oxide to oxyalkyl. suscept. cmpd. | |
| 1d | 14b | 15.65 | 17.60 | -------- | 1.56 | 15.50 | 15.65 | 17.60 | -------- | 1.56 | 15.50 | 40 | -------- | 3,325 |
| 2d | 1d | 15.65 | 35.20 | -------- | 1.56 | 15.50 | 15.65 | 35.20 | -------- | 1.56 | 15.50 | 80 | -------- | 5,085 |
| 3d | 2d | 15.65 | 52.80 | -------- | 1.56 | 15.50 | 15.65 | 52.80 | -------- | 1.56 | 15.50 | 120 | -------- | 6,845 |
| 4d | 3d | 15.65 | 70.40 | -------- | 1.56 | 15.50 | 15.65 | 70.40 | -------- | 1.56 | 15.50 | 160 | -------- | 8,605 |
| 5d | 4d | 15.65 | 88.00 | -------- | 1.56 | 15.50 | 15.65 | 88.00 | -------- | 1.56 | 15.50 | 200 | -------- | 10,365 |
| 6d | 5d | 15.65 | 115.60 | -------- | 1.56 | 15.50 | 15.65 | 115.60 | -------- | 1.56 | 15.50 | 240 | -------- | 12,125 |
| 7d | 6d | 15.65 | 125.20 | -------- | 1.56 | 15.50 | 15.65 | 125.20 | -------- | 1.56 | 15.50 | 280 | -------- | 13,885 |
| 8d | 7d | 15.65 | 125.20 | -------- | 1.56 | 15.50 | 15.65 | 140.80 | -------- | 1.56 | 15.50 | 320 | -------- | 15,645 |
| 9d | 6b | 28.90 | -------- | -------- | 2.80 | 28.75 | 28.90 | 26.40 | -------- | 2.80 | 28.75 | 60 | -------- | 5,530 |
| 10d | 9d | 28.90 | 26.40 | -------- | 2.80 | 28.75 | 28.90 | 52.80 | -------- | 2.80 | 28.75 | 120 | -------- | 8,170 |
| 11d | 10d | 28.90 | 52.80 | -------- | 2.80 | 28.75 | 28.90 | 79.20 | -------- | 2.80 | 28.75 | 180 | -------- | 10,810 |
| 12d | 11d | 28.90 | 79.20 | -------- | 2.80 | 28.75 | 28.90 | 105.60 | -------- | 2.80 | 28.75 | 240 | -------- | 13,450 |
| 13d | 12d | 28.90 | 105.60 | -------- | 2.80 | 28.75 | 28.90 | 132.00 | -------- | 2.80 | 28.75 | 300 | -------- | 16,090 |
| 14d | 13d | 28.90 | 132.00 | -------- | 2.80 | 28.75 | 28.90 | 158.40 | -------- | 2.80 | 28.75 | 360 | -------- | 18,730 |
| 15d | 14d | 28.90 | 158.40 | -------- | 2.80 | 28.75 | 28.90 | 184.80 | -------- | 2.80 | 28.75 | 420 | -------- | 21,370 |
| 16d | 15d | 28.90 | 184.80 | -------- | 2.80 | 28.75 | 28.90 | 211.20 | -------- | 2.80 | 28.75 | 480 | -------- | 24,010 |
| 17d | 18b | 19.45 | -------- | -------- | 1.95 | 19.30 | 19.45 | 19.80 | -------- | 1.95 | 19.30 | 45 | -------- | 3,925 |
| 18d | 17d | 19.45 | 19.80 | -------- | 1.95 | 19.30 | 19.45 | 39.60 | -------- | 1.95 | 19.30 | 90 | -------- | 5,905 |
| 19d | 18d | 19.45 | 39.60 | -------- | 1.95 | 19.30 | 19.45 | 59.40 | -------- | 1.95 | 19.30 | 135 | -------- | 7,885 |
| 20d | 19d | 19.45 | 59.40 | -------- | 1.95 | 19.30 | 19.45 | 79.20 | -------- | 1.95 | 19.30 | 180 | -------- | 9,865 |
| 21d | 20d | 19.45 | 79.20 | -------- | 1.95 | 19.30 | 19.45 | 99.00 | -------- | 1.95 | 19.30 | 225 | -------- | 11,845 |
| 22d | 21d | 19.45 | 99.00 | -------- | 1.95 | 19.30 | 19.45 | 118.80 | -------- | 1.95 | 19.30 | 270 | -------- | 13,825 |
| 23d | 22d | 19.45 | 118.80 | -------- | 1.95 | 19.30 | 19.45 | 138.60 | -------- | 1.95 | 19.30 | 315 | -------- | 15,805 |
| 24d | 23d | 19.45 | 138.60 | -------- | 1.95 | 19.30 | 19.45 | 158.40 | -------- | 1.95 | 19.30 | 360 | -------- | 17,785 |
| 25d | 13b | 18.35 | -------- | -------- | 1.83 | 18.20 | 18.35 | 17.60 | -------- | 1.83 | 18.20 | 40 | -------- | 3,595 |
| 26d | 25d | 18.35 | 17.60 | -------- | 1.83 | 18.20 | 18.35 | 35.20 | -------- | 1.83 | 18.20 | 80 | -------- | 5,355 |
| 27d | 26d | 18.35 | 35.20 | -------- | 1.83 | 18.20 | 18.35 | 52.80 | -------- | 1.83 | 18.20 | 120 | -------- | 7,115 |
| 28d | 27d | 18.35 | 52.80 | -------- | 1.83 | 18.20 | 18.35 | 70.40 | -------- | 1.83 | 18.20 | 160 | -------- | 8,875 |
| 29d | 28d | 18.35 | 70.40 | -------- | 1.83 | 18.20 | 18.35 | 88.00 | -------- | 1.83 | 18.20 | 200 | -------- | 10,635 |
| 30d | 29d | 18.35 | 88.00 | -------- | 1.83 | 18.20 | 18.35 | 105.60 | -------- | 1.83 | 18.20 | 240 | -------- | 12,395 |
| 31d | 30d | 18.35 | 105.60 | -------- | 1.83 | 18.20 | 18.35 | 123.20 | -------- | 1.83 | 18.20 | 280 | -------- | 14,155 |
| 32d | 31d | 18.35 | 123.20 | -------- | 1.83 | 18.20 | 18.35 | 140.80 | -------- | 1.83 | 18.20 | 320 | -------- | 15,915 |
| 33d | 14b | 15.65 | -------- | -------- | .78 | 15.50 | 15.65 | 8.80 | -------- | .78 | 15.50 | 20 | -------- | 2,445 |
| 34d | 33d | 15.65 | 8.80 | -------- | .78 | 15.50 | 15.65 | 17.60 | -------- | .78 | 15.50 | 40 | -------- | 3,325 |
| 35d | 34d | 15.65 | 17.60 | -------- | .78 | 15.50 | 15.65 | 26.40 | -------- | .78 | 15.50 | 60 | -------- | 4,205 |
| 36d | 35d | 15.65 | 26.40 | -------- | .78 | 15.50 | 15.65 | 35.20 | -------- | .78 | 15.50 | 80 | -------- | 5,085 |
| 37d | 36d | 15.65 | 35.20 | -------- | .78 | 15.50 | 15.65 | 44.00 | -------- | .78 | 15.50 | 100 | -------- | 5,965 |
| 38d | 37d | 15.65 | 44.00 | -------- | .78 | 15.50 | 15.65 | 52.80 | -------- | .78 | 15.50 | 120 | -------- | 6,845 |
| 39d | 38d | 15.65 | 52.80 | -------- | .78 | 15.50 | 15.65 | 61.60 | -------- | .78 | 15.50 | 140 | -------- | 7,725 |
| 40d | 39d | 15.65 | 61.60 | -------- | .78 | 15.50 | 15.65 | 70.40 | -------- | .78 | 15.50 | 160 | -------- | 8,605 |
| 41d | 14b | 15.65 | -------- | 15.66 | 1.56 | 15.50 | 15.65 | -------- | 15.66 | 1.56 | 15.50 | -------- | 27 | 3,131 |
| 42d | 41d | 15.65 | -------- | 31.32 | 1.56 | 15.50 | 15.65 | -------- | 31.32 | 1.56 | 15.50 | -------- | 54 | 4,697 |
| 43d | 42d | 15.65 | -------- | 46.98 | 1.56 | 15.50 | 15.65 | -------- | 46.98 | 1.56 | 15.50 | -------- | 81 | 6,263 |
| 44d | 43d | 15.65 | -------- | 62.64 | 1.56 | 15.50 | 15.65 | -------- | 62.64 | 1.56 | 15.50 | -------- | 108 | 7,829 |
| 45d | 44d | 15.65 | -------- | 78.30 | 1.56 | 15.50 | 15.65 | -------- | 78.30 | 1.56 | 15.50 | -------- | 135 | 9,395 |
| 46d | 45d | 15.65 | -------- | 93.96 | 1.56 | 15.50 | 15.65 | -------- | 93.96 | 1.56 | 15.50 | -------- | 162 | 10,961 |
| 47d | 46d | 15.65 | -------- | 109.62 | 1.56 | 15.50 | 15.65 | -------- | 109.62 | 1.56 | 15.50 | -------- | 189 | 12,527 |
| 48d | 47d | 15.65 | -------- | 109.62 | 1.56 | 15.50 | 15.65 | -------- | 125.28 | 1.56 | 15.50 | -------- | 216 | 14,093 |
| 49d | 6b | 28.90 | -------- | -------- | 2.85 | 28.75 | 28.90 | -------- | 29.00 | 2.85 | 28.75 | -------- | 50 | 5,790 |
| 50d | 49d | 28.90 | -------- | 29.00 | 2.85 | 28.75 | 28.90 | -------- | 58.00 | 2.85 | 28.75 | -------- | 100 | 8,690 |
| 51d | 50d | 28.90 | -------- | 58.00 | 2.85 | 28.75 | 28.90 | -------- | 87.00 | 2.85 | 28.75 | -------- | 150 | 11,590 |
| 52d | 51d | 28.90 | -------- | 87.00 | 2.85 | 28.75 | 28.90 | -------- | 116.00 | 2.85 | 28.75 | -------- | 200 | 14,490 |
| 53d | 52d | 28.90 | -------- | 116.00 | 2.85 | 28.75 | 28.90 | -------- | 145.00 | 2.85 | 28.75 | -------- | 250 | 17,390 |
| 54d | 53d | 28.90 | -------- | 145.00 | 2.85 | 28.75 | 28.90 | -------- | 174.00 | 2.85 | 28.75 | -------- | 300 | 21,290 |
| 55d | 54d | 28.90 | -------- | 174.00 | 2.85 | 28.75 | 28.90 | -------- | 203.00 | 2.85 | 28.75 | -------- | 350 | 24,190 |
| 56d | 55d | 28.90 | -------- | 203.00 | 2.85 | 28.75 | 28.90 | -------- | 232.00 | 2.85 | 28.75 | -------- | 400 | 27,090 |
| 57d | 18b | 19.45 | -------- | -------- | 1.95 | 19.30 | 19.45 | -------- | 20.30 | 1.95 | 19.30 | -------- | 35 | 3,975 |
| 58d | 57d | 19.45 | -------- | 20.30 | 1.95 | 19.30 | 19.45 | -------- | 40.60 | 1.95 | 19.30 | -------- | 70 | 6,005 |
| 59d | 58d | 19.45 | -------- | 40.60 | 1.95 | 19.30 | 19.45 | -------- | 60.90 | 1.95 | 19.30 | -------- | 105 | 8,035 |
| 60d | 59d | 19.45 | -------- | 60.90 | 1.95 | 19.30 | 19.45 | -------- | 81.20 | 1.95 | 19.30 | -------- | 140 | 10,065 |
| 61d | 60d | 19.45 | -------- | 81.20 | 1.95 | 19.30 | 19.45 | -------- | 101.50 | 1.95 | 19.30 | -------- | 175 | 12,095 |
| 62d | 61d | 19.45 | -------- | 101.50 | 1.95 | 19.30 | 19.45 | -------- | 121.80 | 1.95 | 19.30 | -------- | 210 | 14,125 |
| 63d | 62d | 19.45 | -------- | 121.80 | 1.95 | 19.30 | 19.45 | -------- | 142.10 | 1.95 | 19.30 | -------- | 245 | 16,155 |
| 64d | 63d | 19.45 | -------- | 142.10 | 1.95 | 19.30 | 19.45 | -------- | 162.40 | 1.95 | 19.30 | -------- | 280 | 18,185 |
| 65d | 13b | 18.35 | -------- | -------- | 1.85 | 18.20 | 18.35 | -------- | 17.40 | 1.85 | 18.20 | -------- | 30 | 3,575 |
| 66d | 65d | 18.35 | -------- | 17.40 | 1.85 | 18.20 | 18.35 | -------- | 34.80 | 1.85 | 18.20 | -------- | 60 | 5,315 |
| 67d | 66d | 18.35 | -------- | 34.80 | 1.85 | 18.20 | 18.35 | -------- | 52.20 | 1.85 | 18.20 | -------- | 90 | 7,055 |
| 68d | 67d | 18.35 | -------- | 52.20 | 1.85 | 18.20 | 18.35 | -------- | 69.60 | 1.85 | 18.20 | -------- | 120 | 8,795 |
| 69d | 68d | 18.35 | -------- | 69.60 | 1.85 | 18.20 | 18.35 | -------- | 87.00 | 1.85 | 18.20 | -------- | 150 | 10,535 |
| 70d | 69d | 18.35 | -------- | 87.00 | 1.85 | 18.20 | 18.35 | -------- | 104.40 | 1.85 | 18.20 | -------- | 180 | 12,275 |
| 71d | 70d | 18.35 | -------- | 104.40 | 1.85 | 18.20 | 18.35 | -------- | 121.80 | 1.85 | 18.20 | -------- | 210 | 14,015 |
| 72d | 71d | 18.35 | -------- | 121.80 | 1.85 | 18.20 | 18.35 | -------- | 139.20 | 1.85 | 18.20 | -------- | 240 | 15,755 |
| 73d | 14b | 15.65 | -------- | -------- | .78 | 15.50 | 15.65 | -------- | 7.83 | .78 | 15.50 | -------- | 13.5 | 2,348 |
| 74d | 73d | 15.65 | -------- | 7.83 | .78 | 15.50 | 15.65 | -------- | 15.66 | .78 | 15.50 | -------- | 27.0 | 3,131 |
| 75d | 74d | 15.65 | -------- | 15.66 | .78 | 15.50 | 15.65 | -------- | 23.49 | .78 | 15.50 | -------- | 40.5 | 3,914 |
| 76d | 75d | 15.65 | -------- | 23.49 | .78 | 15.50 | 15.65 | -------- | 31.32 | .78 | 15.50 | -------- | 54.0 | 4,697 |
| 77d | 76d | 15.65 | -------- | 31.32 | .78 | 15.50 | 15.65 | -------- | 39.15 | .78 | 15.50 | -------- | 67.5 | 5,480 |
| 78d | 77d | 15.65 | -------- | 39.15 | .78 | 15.50 | 15.65 | -------- | 46.98 | .78 | 15.50 | -------- | 81.0 | 6,263 |
| 79d | 78d | 15.65 | -------- | 46.98 | .78 | 15.50 | 15.65 | -------- | 54.81 | .78 | 15.50 | -------- | 94.5 | 7,046 |
| 80d | 79d | 15.65 | -------- | 54.81 | .78 | 15.50 | 15.65 | -------- | 62.64 | .78 | 15.50 | -------- | 108.0 | 7,829 |

*Oxyalkylation-susceptible.

TABLE VII

| Ex. No. | Composition before | | | | | | Composition at end | | | | | Molal ratio | | Molec. wt. based on theoretical value |
|---|---|---|---|---|---|---|---|---|---|---|---|---|---|---|
| | O-S* cmpd., ex. No. | O-S* cmpd., lbs. | Ethl. oxide, lbs. | Propl. oxide, lbs. | Catalyst, lbs. | Solvent, lbs. | O-S* cmpd., lbs. | Ethl. oxide, lbs. | Propl. oxide, lbs. | Catalyst, lbs. | Solvent, lbs. | Ethyl. oxide to oxyalkyl. suscept. cmpd. | Propl. oxide to oxyalkyl. suscept. cmpd. | |
| 1e | 35d | 15.65 | 26.40 | | 0.78 | 15.50 | 15.65 | 26.40 | 7.83 | 0.78 | 15.50 | 60 | 13.5 | 4,988 |
| 2e | 1e | 15.65 | 26.40 | 7.83 | .78 | 15.50 | 15.65 | 26.40 | 15.66 | .78 | 15.50 | 60 | 27.0 | 5,771 |
| 3e | 2e | 15.65 | 26.40 | 15.66 | .78 | 15.50 | 15.65 | 26.40 | 23.49 | .78 | 15.50 | 60 | 40.5 | 6,554 |
| 4e | 3e | 15.65 | 26.40 | 23.49 | .78 | 15.50 | 15.65 | 26.40 | 31.32 | .78 | 15.50 | 60 | 54.01 | 7,337 |
| 5e | 4e | 15.65 | 26.40 | 31.32 | .78 | 15.50 | 15.65 | 26.40 | 39.15 | .78 | 15.50 | 60 | 67.5 | 8,120 |
| 6e | 5e | 15.65 | 26.40 | 39.15 | .78 | 15.50 | 15.65 | 26.40 | 46.98 | .78 | 15.50 | 60 | 81.01 | 8,903 |
| 7e | 6e | 15.65 | 26.40 | 46.98 | .78 | 15.50 | 15.65 | 26.40 | 54.81 | .78 | 15.50 | 60 | 94.5 | 9,686 |
| 8e | 7e | 15.65 | 26.40 | 54.81 | .78 | 15.50 | 15.65 | 26.40 | 62.64 | .78 | 15.50 | 60 | 108.0 | 10,469 |
| 9e | 39d | 15.65 | 61.60 | | 1.56 | 15.50 | 15.65 | 61.60 | 7.83 | 1.56 | 15.50 | 140 | 13.5 | 8,508 |
| 10e | 9e | 15.65 | 61.60 | 7.83 | 1.56 | 15.50 | 15.65 | 61.60 | 15.66 | 1.56 | 15.50 | 140 | 27.0 | 9,291 |
| 11e | 10e | 15.65 | 61.60 | 15.66 | 1.56 | 15.50 | 15.65 | 61.60 | 31.32 | 1.56 | 15.50 | 140 | 54.0 | 10,857 |
| 12e | 11e | 15.65 | 61.60 | 31.32 | 1.56 | 15.50 | 15.65 | 61.60 | 39.15 | 1.56 | 15.50 | 140 | 67.5 | 11,640 |
| 13e | 12e | 15.65 | 61.60 | 39.15 | 1.56 | 15.50 | 15.65 | 61.60 | 46.98 | 1.56 | 15.50 | 140 | 81.0 | 12,423 |
| 14e | 13e | 15.65 | 61.60 | 46.98 | 1.56 | 15.50 | 15.65 | 61.60 | 78.30 | 1.56 | 15.50 | 140 | 135.0 | 15,555 |
| 15e | 14e | 15.65 | 61.60 | 78.30 | 1.56 | 15.50 | 15.65 | 61.60 | 93.96 | 1.56 | 15.50 | 140 | 162.0 | 17,121 |
| 16e | 15e | 15.65 | 61.60 | 93.96 | 1.56 | 15.50 | 15.65 | 61.60 | 109.62 | 1.56 | 15.50 | 140 | 189.0 | 18,687 |
| 17e | 75d | 15.65 | | 23.49 | 1.56 | 15.50 | 15.65 | 8.80 | 23.49 | 1.56 | 15.50 | 20 | 40.5 | 4,795 |
| 18e | 17e | 15.65 | 8.80 | 23.49 | 1.56 | 15.50 | 15.65 | 17.60 | 23.49 | 1.56 | 15.50 | 40 | 40.5 | 5,675 |
| 19e | 18e | 15.65 | 17.60 | 23.49 | 1.56 | 15.50 | 15.65 | 26.40 | 23.49 | 1.56 | 15.50 | 60 | 40.5 | 6,555 |
| 20e | 19e | 15.65 | 26.40 | 23.49 | 1.56 | 15.50 | 15.65 | 35.20 | 23.49 | 1.56 | 15.50 | 80 | 40.5 | 7,435 |
| 21e | 20e | 15.65 | 35.20 | 23.49 | 1.56 | 15.50 | 15.65 | 44.00 | 23.49 | 1.56 | 15.50 | 100 | 40.5 | 8,315 |
| 22e | 21e | 15.65 | 44.00 | 23.49 | 1.56 | 15.50 | 15.65 | 52.80 | 23.49 | 1.56 | 15.50 | 120 | 40.5 | 9,195 |
| 23e | 22e | 15.65 | 52.80 | 23.49 | 1.56 | 15.50 | 15.65 | 61.60 | 23.49 | 1.56 | 15.50 | 140 | 40.5 | 10,075 |
| 24e | 23e | 15.65 | 61.60 | 23.49 | 1.56 | 15.50 | 15.65 | 70.40 | 23.49 | 1.56 | 15.50 | 160 | 40.5 | 10,955 |
| 25e | 79d | 15.65 | | 54.81 | 1.56 | 15.50 | 15.65 | 8.80 | 54.81 | 1.56 | 15.50 | 20 | 94.5 | 7,926 |
| 26e | 25e | 15.65 | 8.80 | 54.81 | 1.56 | 15.50 | 15.65 | 17.60 | 54.81 | 1.56 | 15.50 | 40 | 94.5 | 8,806 |
| 27e | 26e | 15.65 | 17.60 | 54.81 | 1.56 | 15.50 | 15.65 | 26.40 | 54.81 | 1.56 | 15.50 | 60 | 94.5 | 9,686 |
| 28e | 27e | 15.65 | 26.40 | 54.81 | 1.56 | 15.50 | 15.65 | 35.20 | 54.81 | 1.56 | 15.50 | 80 | 94.5 | 10,566 |
| 29e | 28e | 15.65 | 35.20 | 54.81 | 1.56 | 15.50 | 15.65 | 44.00 | 54.81 | 1.56 | 15.50 | 100 | 94.5 | 11,446 |
| 30e | 29e | 15.65 | 44.00 | 54.81 | 1.56 | 15.50 | 15.65 | 61.60 | 54.81 | 1.56 | 15.50 | 140 | 94.5 | 13,206 |
| 31e | 30e | 15.65 | 61.60 | 54.81 | 1.56 | 15.50 | 15.65 | 70.40 | 54.81 | 1.56 | 15.50 | 160 | 94.5 | 14,086 |
| 32e | 31e | 15.65 | 70.40 | 54.81 | 1.56 | 15.50 | 15.65 | 88.00 | 54.81 | 1.56 | 15.50 | 200 | 94.5 | 15,846 |

*Oxyalkylation-susceptible.

TABLE VIII

| Ex. No. | Max. temp., °C. | Max. pres., p.s.i. | Time, hrs. | Solubility | | |
|---|---|---|---|---|---|---|
| | | | | Water | Xylene | Kerosene |
| 1d | 125-130 | 10-15 | ½ | Insoluble | Soluble | Insoluble. |
| 2d | 125-130 | 10-15 | ½ | Emulsifiable | do | Do. |
| 3d | 125-130 | 10-15 | ½ | Soluble | Insoluble | Do. |
| 4d | 125-130 | 10-15 | ¾ | do | do | Do. |
| 5d | 125-130 | 10-15 | 1¼ | do | do | Do. |
| 6d | 125-130 | 10-15 | 2 | do | do | Do. |
| 7d | 125-130 | 10-15 | 2 | do | do | Do. |
| 8d | 125-130 | 10-15 | 2¼ | do | do | Do. |
| 9d | 125-130 | 10-15 | 1 | Emulsifiable | Soluble | Do. |
| 10d | 125-130 | 10-15 | 1 | Soluble | Insoluble | Do. |
| 11d | 125-130 | 10-15 | 1¼ | do | do | Do. |
| 12d | 125-130 | 10-15 | 1¼ | do | do | Do. |
| 13d | 125-130 | 10-15 | 1¾ | do | do | Do. |
| 14d | 125-130 | 10-15 | 2 | do | do | Do. |
| 15d | 125-130 | 10-15 | 2¾ | do | do | Do. |
| 16d | 125-130 | 10-15 | 3 | do | do | Do. |
| 17d | 125-130 | 10-15 | ¾ | Insoluble | Soluble | Do. |
| 18d | 125-130 | 10-15 | ¾ | Emulsifiable | Insoluble | Do. |
| 19d | 125-130 | 10-15 | 1 | Soluble | do | Do. |
| 20d | 125-130 | 10-15 | 1 | do | do | Do. |
| 21d | 125-130 | 10-15 | 1¼ | do | do | Do. |
| 22d | 125-130 | 10-15 | 1¾ | do | do | Do. |
| 23d | 125-130 | 10-15 | 2 | do | do | Do. |
| 24d | 125-130 | 10-15 | 2¾ | do | do | Do. |
| 25d | 125-130 | 10-15 | ¾ | Emulsifiable | Soluble | Do. |
| 26d | 125-130 | 10-15 | ¾ | Soluble | Insoluble | Do. |
| 27d | 125-130 | 10-15 | 1½ | do | do | Do. |
| 28d | 125-130 | 10-15 | 1¾ | do | do | Do. |
| 29d | 125-130 | 10-15 | 2 | do | do | Do. |
| 30d | 125-130 | 10-15 | 2 | do | do | Do. |
| 31d | 125-130 | 10-15 | 2¼ | do | do | Do. |
| 32d | 125-130 | 10-15 | 2½ | do | do | Do. |
| 33d | 125-130 | 10-15 | ½ | Insoluble | Soluble | Do. |
| 34d | 125-130 | 10-15 | ½ | do | do | Do. |
| 35d | 125-130 | 10-15 | ¾ | Emulsifiable | Insoluble | Do. |
| 36d | 125-130 | 10-15 | ¾ | do | do | Do. |
| 37d | 125-130 | 10-15 | 1 | Soluble | do | Do. |
| 38d | 125-130 | 10-15 | 1 | do | do | Do. |
| 39d | 125-130 | 10-15 | 1 | do | do | Do. |
| 40d | 125-130 | 10-15 | 1¼ | do | do | Do. |
| 41d | 125-130 | 10-15 | 1¼ | Insoluble | Soluble | Do. |
| 42d | 125-130 | 10-15 | 1¼ | do | do | Do. |
| 43d | 125-130 | 10-15 | 1¼ | do | do | Dispersible. |
| 44d | 125-130 | 10-15 | 2 | do | do | Soluble. |
| 45d | 125-130 | 10-15 | 2 | do | do | Do. |
| 46d | 125-130 | 10-15 | 2½ | do | do | Do. |
| 47d | 125-130 | 10-15 | 2½ | do | do | Do. |
| 48d | 125-130 | 10-15 | 3 | do | do | Do. |
| 49d | 125-130 | 10-15 | 1½ | do | do | Insoluble. |
| 50d | 125-130 | 10-15 | 1¾ | do | do | Do. |

TABLE VIII—Continued

| Ex. No. | Max. temp., °C. | Max. pres., p.s.i. | Time, hrs. | Solubility | | |
|---|---|---|---|---|---|---|
| | | | | Water | Xylene | Kerosene |
| 51d | 125-130 | 10-15 | 2¾ | do | do | Dispersible. |
| 52d | 125-130 | 10-15 | 2¼ | do | do | Soluble. |
| 53d | 125-130 | 10-15 | 2½ | do | do | Do. |
| 54d | 125-130 | 10-15 | 3 | do | do | Do. |
| 55d | 125-130 | 10-15 | 3¼ | do | do | Do. |
| 56d | 125-130 | 10-15 | 3¾ | do | do | Do. |
| 57d | 125-130 | 10-15 | 1 | do | do | Insoluble. |
| 58d | 125-130 | 10-15 | 1¼ | do | do | Do. |
| 59d | 125-130 | 10-15 | 1¼ | do | do | Soluble. |
| 60d | 125-130 | 10-15 | 1¾ | do | do | Do. |
| 61d | 125-130 | 10-15 | 2¼ | do | do | Do. |
| 62d | 125-130 | 10-15 | 2½ | do | do | Do. |
| 63d | 125-130 | 10-15 | 2½ | do | do | Do. |
| 64d | 125-130 | 10-15 | 3¾ | do | do | Do. |
| 65d | 125-130 | 10-15 | ¾ | do | do | Insoluble. |
| 66d | 125-130 | 10-15 | 1 | do | do | Do. |
| 67d | 125-130 | 10-15 | 1¼ | do | do | Dispersible. |
| 68d | 125-130 | 10-15 | 1¾ | do | do | Soluble. |
| 69d | 125-130 | 10-15 | 2 | do | do | Do. |
| 70d | 125-130 | 10-15 | 2 | do | do | Do. |
| 71d | 125-130 | 10-15 | 2½ | do | do | Do. |
| 72d | 125-130 | 10-15 | 2¾ | do | do | Do. |
| 73d | 125-130 | 10-15 | ½ | do | do | Insoluble. |
| 74d | 125-130 | 10-15 | ½ | do | do | Do. |
| 75d | 125-130 | 10-15 | ¾ | do | do | Do. |
| 76d | 125-130 | 10-15 | ¾ | do | do | Do. |
| 77d | 125-130 | 10-15 | 1 | do | do | Do. |
| 78d | 125-130 | 10-15 | 1 | do | do | Dispersible. |
| 79d | 125-130 | 10-15 | 1½ | do | do | Do. |
| 80d | 125-130 | 10-15 | 1¾ | do | do | Soluble. |

TABLE IX

| Ex. No. | Max. temp., °C. | Max. pres., p.s.i. | Time, hrs. | Solubility | | |
|---|---|---|---|---|---|---|
| | | | | Water | Xylene | Kerosene |
| 1e | 125-130 | 10-15 | 2½ | Emulsifiable | Soluble | Insoluble. |
| 2e | 125-130 | 10-15 | ¾ | do | do | Do. |
| 3e | 125-130 | 10-15 | ¾ | Insoluble | do | Do. |
| 4e | 125-130 | 10-15 | 1 | do | do | Do. |
| 5e | 125-130 | 10-15 | 1 | do | do | Do. |
| 6e | 125-130 | 10-15 | 1½ | do | do | Dispersible. |
| 7e | 125-130 | 10-15 | 1½ | do | do | Soluble. |
| 8e | 125-130 | 10-15 | 2 | do | do | Do. |
| 9e | 125-130 | 10-15 | 6 | Soluble | Insoluble | Insoluble. |
| 10e | 125-130 | 10-15 | 1 | do | Dispersible | Do. |
| 11e | 125-130 | 10-15 | 1¼ | do | Soluble | Do. |
| 12e | 125-130 | 10-15 | 2 | Emulsifiable | do | Do. |
| 13e | 125-130 | 10-15 | 2 | do | do | Do. |
| 14e | 125-130 | 10-15 | 2½ | Insoluble | do | Do. |
| 15e | 125-130 | 10-15 | 2¾ | do | do | Do. |
| 16e | 125-130 | 10-15 | 3 | do | do | Soluble. |
| 17e | 125-130 | 10-15 | 2½ | do | do | Insoluble. |
| 18e | 125-130 | 10-15 | ½ | do | do | Do. |
| 19e | 125-130 | 10-15 | ¾ | Emulsifiable | do | Do. |
| 20e | 125-130 | 10-15 | 1 | do | do | Do. |
| 21e | 125-130 | 10-15 | 1 | do | do | Do. |
| 22e | 125-130 | 10-15 | 1½ | do | do | Do. |
| 23e | 125-130 | 10-15 | 2 | Soluble | Insoluble | Do. |
| 24e | 125-130 | 10-15 | 2 | do | do | Do. |
| 25e | 125-130 | 10-15 | 6½ | Insoluble | Soluble | Dispersible. |
| 26e | 125-130 | 10-15 | ¾ | do | do | Insoluble. |
| 27e | 125-130 | 10-15 | 1 | do | do | Do. |
| 28e | 125-130 | 10-15 | 1 | Emulsifiable | do | Do. |
| 29e | 125-130 | 10-15 | 1½ | do | do | Do. |
| 30e | 125-130 | 10-15 | 2 | do | do | Do. |
| 31e | 125-130 | 10-15 | 3 | do | do | Do. |
| 32e | 125-130 | 10-15 | 3½ | Soluble | Insoluble | Do. |

NOTE.—In the above table, the time period in regard to 1e, 9e, 17e, and 25e, is the total time for both oxyalkylation stages. In respect to all others the time period indicated is the time required to introduce the second alkylene oxide employed.

PART 5

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of our process.

In practicing the present process, the treating or demulsifying agent is used in the conventional way, well known to the art, described, for example, in Patent 2,626,929, dated January 27, 1953, Part 3, and reference is made thereto for a description of conventional procedures of demulsifying, including batch, continuous, and down-the-hole demulsification, the process essentially involving introducing a small amount of demulsifier into a large amount of emulsion with adequate admixture with or without the application of heat, and allowing the mixture to stratify.

As noted above, the products herein described may be used not only in diluted form, but also may be used admixed with some other chemical demulsifier. A mixture which illustrates such combination is the following:

Oxyalkylated derivative, for example, the product of Example 4e, 20%;
A cyclohexylamine salt of a polypropylated naphthalene monosulfonic acid, 24%;
An ammonium salt of a polypropylated naphthalene monosulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

Having thus described our invention, what we claim as new and desire to obtain by Letters Patent, is:

1. A process for breaking petroleum emulsions of the water-in-oil type, characterized by subjecting the emulsion to the action of a demulsifier including synthetic hydrophile products; said synthetic hydrophile products being the oxyalkylation derivatives of the reaction products obtained by condensing (A) an oxyalkylation-susceptible fusible, organic solvent-soluble, water insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

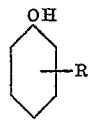

in which R is a hydrocarbon radical having at least 4 and not more than 18 carbon atoms and substituted in the 2,4,6 position; and (B) non-aryl hydrophile polyepoxides characterized by the fact that the precursory polyhydric alcohol, in which an oxygen-linked hydrogen atom is subsequently replaced by the radical

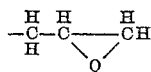

in the polyepoxide, is water-soluble; said polyepoxides being free from reactive functional groups other than epoxy and hydroxyl groups and characterized by the fact that the divalent linkage uniting the terminal epoxide groups is free from any radical having more than 4 uninterrupted carbon atoms in a single chain; with the proviso that the ratio of reactant (A) to reactant (B) in the proportion of approximately 2 moles of (A) to 1 mole of (B); with the further proviso that said reactive compounds (A) and (B) be members of the class consisting of nonthermosetting solvent-soluble liquids and low-melting solids; and with the final proviso that the reaction product be a member of the class consisting of acylation- and oxyalkylation-susceptible solvent-soluble liquids and low-melting solids; and said reaction between (A) and (B) being conducted below the pyrolytic point of the reactants and the resultants of reaction; followed by an oxyalkylation step by means of an alpha-beta alkylene monoepoxide having not more than 4 carbon atoms and selected from the class consisting of ethylene oxide, propylene oxide, butylene oxide, glycide and methyl-glycide.

2. The process of claim 1 in which the polyepoxides are diepoxides.

3. The process of claim 1 wherein the polyepoxides are diepoxides containing at least one ether linkage.

4. The process of claim 1 wherein the polyepoxides are diepoxides containing at least one ether linkage and at least one hydroxyl radical.

5. The process of claim 1 wherein the polyepoxides are diepoxides containing at least one ether linkage and at least one hydroxy radical with the added proviso that the total number of carbon atoms in the polyepoxide be not over 20.

6. The process of claim 1 wherein the polyepoxides are diepoxides containing at least one ether linkage and at least one hydroxyl radical with the added proviso that the total number of carbon atoms in the polyepoxide be not over 20 and free from any radical having more than three uninterrupted carbon atoms in a single chain.

7. A process for breaking petroleum emulsions of the water-in-oil type, characterized by subjecting the emulsion to the action of a demulsifier including synthetic hydrophile products; said synthetic hydrophile products being the oxyalkylation derivatives of the reaction products obtained by condensing (A) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

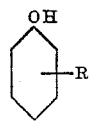

in which R is a hydrocarbon radical having at least 4 and not more than 14 carbon atoms and substituted in the 2,4,6 position; and (B) non-aryl hydrophile hydroxylated diepoxides containing at least one ether linkage and characterized by the fact that the precursory polyhydric alcohol, in which an oxygen-linked hydrogen atom is subsequently replaced by the radical

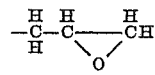

in the diepoxide, is water soluble; said hydroxylated diepoxide being free from reactive functional groups other than epoxy and hydroxyl groups and characterized by the fact that the divalent linkage uniting the terminal epoxide groups is free from any radical having more than 3 uninterrupted carbon atoms in a single chain; and total number of carbon atoms in said diepoxide being not over 20; with the proviso that the ratio of reactant (A) to reactant (B) be in the proportion of approximately 2 moles of (A) to 1 mole of (B); with the further proviso that said reactive compounds (A) and (B) be members of the class consisting of nonthermosetting solvent-soluble liquids and low-melting solids; and with the final proviso that the reaction product be a member of the class consisting of acylation- and oxyalkylation-susceptible solvent-soluble liquids and low-melting solids; and said reaction between (A) and (B) being conducted below the pyrolytic point of the reactants and the resultants of reaction; followed by an oxyalkylation step by means of an alpha-beta alkylene monoepoxide having not more than 4 carbon atoms and selected from the class consisting of ethylene oxide, propylene oxide, butylene oxide, glycide and methylglycide.

8. The process of claim 7 wherein the aldehyde is formaldehyde.

9. The process of claim 7 wherein the aldehyde is formaldehyde and R is substituted in the para- position.

10. The process of claim 7 wherein the aldehyde is formaldehyde and R is substituted in the para- position and the initial resin contains not over 6 phenolic units.

11. The process of claim 1 with the proviso that the synthetic hydrophile products in an equal weight of xylene are sufficient to produce an emulsion when said xylene solution is shaken vigorously with 1 to 3 volumes of water.

12. The process of claim 2 with the proviso that the synthetic hydrophile products in an equal weight of xylene are sufficient to produce an emulsion when said xylene solution is shaken vigorously with 1 to 3 volumes of water.

13. The process of claim 3 with the proviso that the synthetic hydrophile products in an equal weight of xylene are sufficient to produce an emulsion when said xylene solution is shaken vigorously with 1 to 3 volumes of water.

14. The process of claim 4 with the proviso that the synthetic hydrophile products in an equal weight of xylene are sufficient to produce an emulsion when said xylene solution is shaken vigorously with 1 to 3 volumes of water.

15. The process of claim 5 with the proviso that the synthetic hydrophile products in an equal weight of xylene are sufficient to produce an emulsion when said xylene solution is shaken vigorously with 1 to 3 volumes of water.

16. The process of claim 6 with the proviso that the synthetic hydrophile products in an equal weight of xylene are sufficient to produce an emulsion when said xylene solution is shaken vigorously with 1 to 3 volumes of water.

17. The process of claim 7 with the proviso that the synthetic hydrophile products in an equal weight of xylene are sufficient to produce an emulsion when said xylene solution is shaken vigorously with 1 to 3 volumes of water.

18. The process of claim 8 with the proviso that the synthetic hydrophile products in an equal weight of xylene are sufficient to produce an emulsion when said xylene solution is shaken vigorously with 1 to 3 volumes of water.

19. The process of claim 9 with the proviso that the synthetic hydrophile products in an equal weight of xylene are sufficient to produce an emulsion when said xylene solution is shaken vigorously with 1 to 3 volumes of water.

20. The process of claim 10 with the proviso that the synthetic hydrophile products in an equal weight of xylene are sufficient to produce an emulsion when said xylene solution is shaken vigorously with 1 to 3 volumes of water.

References Cited in the file of this patent

UNITED STATES PATENTS

| | | |
|---|---|---|
| 2,208,331 | Olin | July 16, 1940 |
| 2,224,359 | Rosenblum | Dec. 10, 1940 |
| 2,454,541 | Bock et al. | Nov. 23, 1948 |
| 2,499,365 | De Groote et al. | Mar. 7, 1950 |
| 2,507,910 | Keiser et al. | May 16, 1950 |
| 2,568,116 | De Groote et al. | Sept. 18, 1951 |
| 2,602,052 | De Groote | July 1, 1952 |
| 2,615,853 | Kirkpatrick et al. | Oct. 28, 1952 |